March 29, 1966 — L. A. URBAN — 3,242,673
FUEL CONTROL
Filed Oct. 8, 1963 — 4 Sheets-Sheet 1

INVENTOR
LOUIS A. URBAN
BY Norman Friedland
ATTORNEY

March 29, 1966   L. A. URBAN   3,242,673
FUEL CONTROL
Filed Oct. 8, 1963   4 Sheets-Sheet 2

FIG. 2

INVENTOR
LOUIS A. URBAN
BY Norman Friedland
ATTORNEY

March 29, 1966  L. A. URBAN  3,242,673
FUEL CONTROL
Filed Oct. 8, 1963  4 Sheets-Sheet 4

FIG. 6

INVENTOR
LOUIS A. URBAN
BY Norman Friedland
ATTORNEY

United States Patent Office 3,242,673
Patented Mar. 29, 1966

3,242,673
FUEL CONTROL
Louis A. Urban, Granby, Conn., assignor to United Aircraft Corporation, East Hartford, Conn., a corporation of Delaware
Filed Oct. 8, 1963, Ser. No. 314,755
14 Claims. (Cl. 60—39.28)

This invention relates to fuel controls and particularly to fuel controls for controlling turbine types of power plants.

As is generally well known in the art, the fuel control is a combination of metering devices and computing mechanism serving to control the quantity of fuel to the engine in an amount so as to allow the engine to operate within its safe operating limits and yet provide efficient and optimum operating conditions. Fundamentally, the fuel control functions to automatically adjust the quantity of fuel metered to the engine to obtain the proper thrust or horsepower required by virtue of the pilot of the aircraft positioning the power lever. Thus, the fuel control assures that the over-temperature conditions, surge, rich and lean flame out do not ensue.

In the heretofore designed fuel controls it has been customary to schedule the flow of fuel to the engine as a function of measured engine operating parameters by building the schedule into the control by use of cams and the like that make the fuel flow compatible with engine operations. Because the schedule is built into the fuel control, in order to properly design the computing mechanism of the fuel control, it has been necessary to not only known the various operating conditions of the engine, but also to know the type of fuel to be used. Obviously, such a fuel control is limited because it can only be employed where the fuel for which it was designed for is being used. The reason being that the ultimate function of the control is to develop a preascertained quantity of B.t.u.'s for a given operating condition and the heat content of the fuel must be known beforehand. Hence, by virtue of this characteristic, the heretofore known fuel controls most generally in use inherently are limited because they are incapable of utilizing more than one type of fuel having different energy levels. Moreover, the use of such a fuel control is not suitable for use with a regenerative type of engine because the heat added by the regeneration cycle adds a quantity of heat not accounted for when considering the heat value of the fuel. Thus, it is noted that these heretofore known fuel controls are limited to open-loop types of controls and as mentioned above, it is necessary to know the heating value of the fuel in order to compute the turbine inlet temperature which avoid surge and over-temperature.

I have found that I can provide a fuel control which operates independently of the fuel type so that it is not necessary when designing the fuel control to know the heating value of the fuel. Thus, it is also possible to utilize such a fuel control to handle any type of fuel. Also, such a fuel control employing my invention has particular utility for use in a regenerative type of engine.

To this end, I have selected as a control parameter the burner pressure drop for scheduling the acceleration for avoiding surge and over-temperature. This differs from the heretofore known fuel controls since it is a complete departure from utilizing the $$\left(\frac{W_f}{P_3}\right)$$

ratio parameter, (where $W_f$ equals the fuel flow and $P_3$ equals compressor discharge pressure). Such a fuel control is shown and described in U.S. Patent No. 2,822,666 granted to S. Best on February 11, 1958.

To more fully appreciate the use of this control parameter, it is necessary to understand that surge and turbine inlet temperature can be uniquely related to the pressure drop across the burner ($\Delta P_b$) divided by the pressure discharging from the compressor ($P_3$), the temperature at the inlet of the compressor ($T_2$) and the speed of the compressor ($N_g$). This unique relationship can be shown by considering that the ratio of the pressure drop across the burner to compressor discharge pressure is a function of compressor exit corrected flow and burner temperature ratio: As is generally understood corrected parameter means that the parameter is referenced to a standard set of conditions $$\frac{\Delta P_b}{P_3} = f\left(w_{3c}, \frac{T_4}{T_3}\right)$$

Where:

$$\frac{T_4}{T_3} = \frac{T_4/T_2}{T_3/T_2}$$

Where:
$f$ = a function of
$W_{3c}$ = corrected air weight flow at the compressor exit
$T_4$ = temperature at the inlet of turbine
$T_3$ = temperature at compressor discharge
$T_2$ = temperature at the inlet of the compressor Since $$\frac{T_4}{T_3}$$

is the ratio of two corrected parameters, it too is a corrected parameter. Since $W_{3c}$ is also a corrected parameter, $$\frac{\Delta P_b}{P_3}$$

is determined by two corrected parameters and is itself a corrected parameter. Since any two corrected parameters are necessary and sufficient to define all other corrected parameters in steady-state operation, and more generally, all corrected parameters upstream of the turbine in steady state or transient, it can be stated that:

$$\frac{\Delta P_b}{P_3} = f\left(\frac{N_g}{\sqrt{T_2}}, \frac{T_4}{T_2}\right)$$

or $$\frac{\Delta P_b}{P_3} = f\left(\frac{N_g}{\sqrt{T_2}}, \frac{P_3}{P_2}\right)$$

Figure 6:
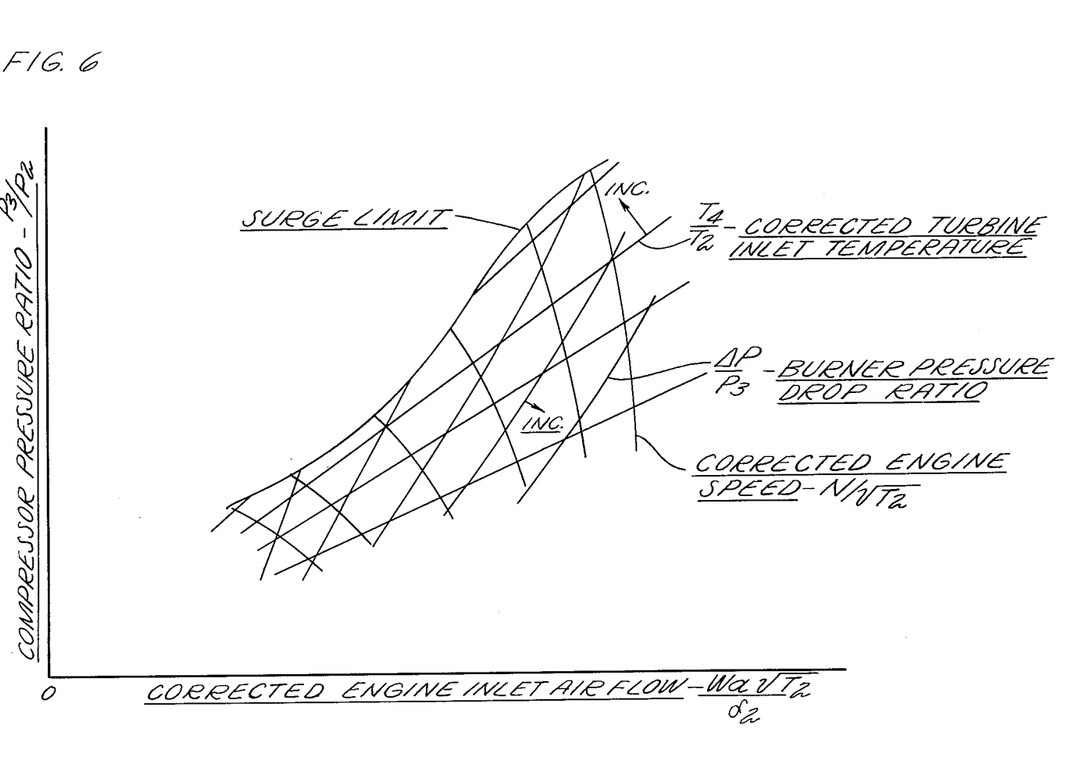
FIGURE 6 is a graphical showing of a customary compressor map.

Where
$N_g$ = rotational speed of the compressor
$P_2$ = compressor inlet pressure This feature can be readily comprehended by referring to the compressor map shown in FIG. 6. For example, it is noted from the graph that by knowing any two corrected parameters, say corrected temperature and corrected speed, pressure ratio can easily be ascertained. All other parameters can be found in a like manner. Rearranging, it may also be said that for surge protection $$\frac{P_3}{P_2} = f\left(N_g, T_2, \frac{P_3}{\Delta P_b}\right)$$

and for transient or steady-state temperature control $$T_4 = f\left(N_g, T_2, \frac{P_3}{\Delta P_b}\right)$$

Combining the temperature and surge limits by selecting the lower limiting value of $$\frac{P_3}{\Delta P_b}$$

for each, a complete acceleration limit can be defined:

$$\left|\frac{P_3}{\Delta P_b}\right| \text{ acceleration limit}=f(Ng,\ T_2)$$

Obviously, for convenience the $$\frac{P_3}{\Delta P_b}$$

expression may be inverted to be expressed in terms of $$\frac{\Delta P_b}{P_3}$$

Utilization of the pressure drop across the burner divided by compressor discharge pressure as a control parameter affords advantages over the heretofore known types of fuel controls some of which are:

(1) It is independent of the fuel type or source of heat energy.
(2) It provides accurate steady-state or acceleration control.
(3) It provides a good relationship between $$\frac{P_3}{\Delta P_b}$$

and $T_4$; namely, a one percent $$\frac{P_3}{\Delta P_b}$$

error will give approximately a one percent $T_4$ error.
(4) Inadvertent surge will automatically reduce fuel flow.
(5) The sensed pressure ratio is larger than the Mach ratio on an axial flow compressor.
(6) The pressure ratio is nearly independent of engine size, type or geometry, and
(7) In the event of compressor air bleed or battle damage, the fuel control reduces fuel in order to avoid surge and overtemperature.

It is therefore an object of this invention to provide a fuel control of the type described to achieve the advantages enumerated in the immediately above paragraph.

A still further object of this invention is to provide in a control as described the use of the ratio of compressor discharge pressure to the pressure drop across the burner as a control parameter.

It still is a further object of this invention to provide in a fuel control as described a closed loop scheduling type of fuel control instead of an open loop type as has been heretofore used.

Other features and advantages will be apparent from the specification and claims and from the accompanying drawings which illustrate an embodiment of the invention.

Figures 1, 3, 4:
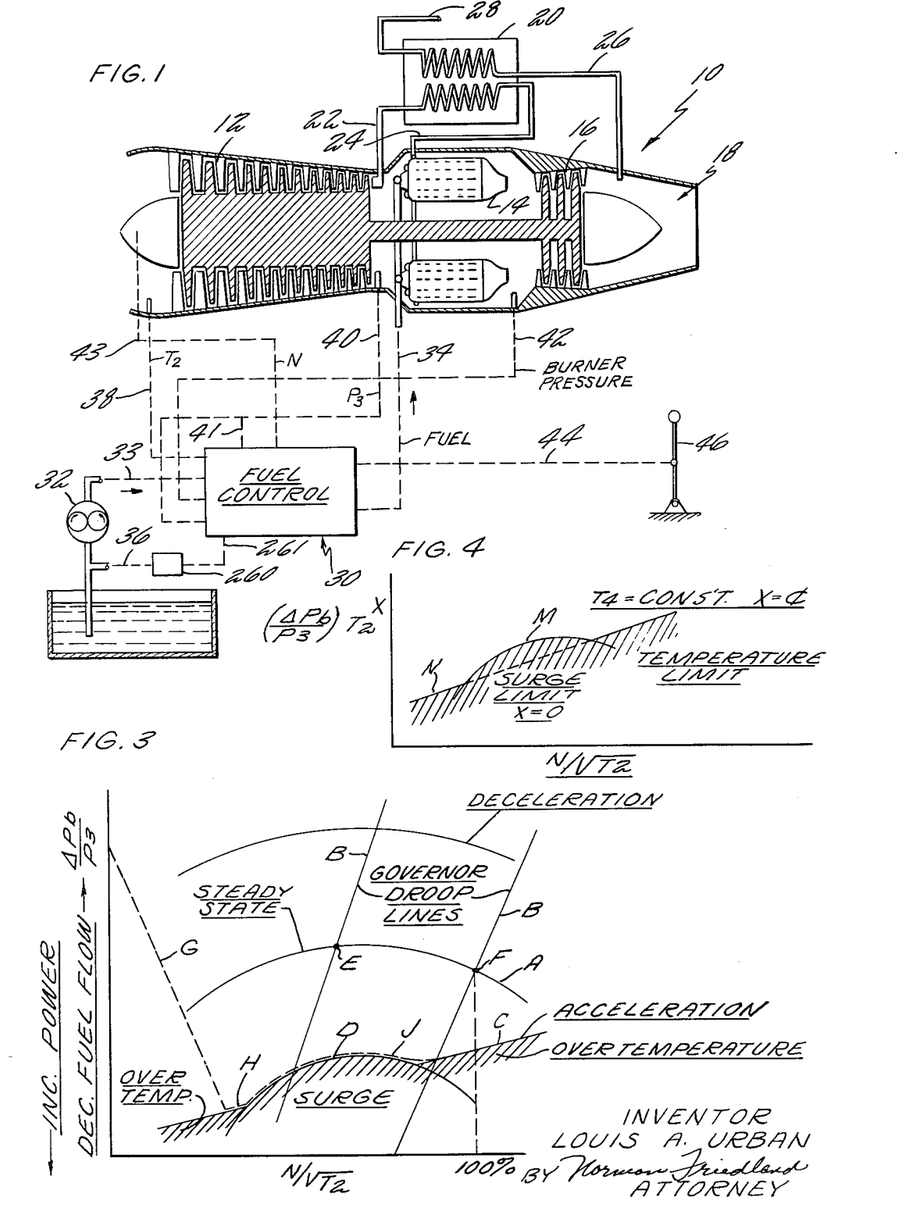
FIGURE 1 is a schematic illustrating a fuel control controlling a regenerative type of jet engine.
FIGURE 3 is a graphical illustration showing a typical operating condition of the fuel control.
FIGURE 4 is a graphical illustration of the acceleration limit as scheduled by the fuel control.

Referring more particularly to FIGURE 1 which shows a turbine type of engine of the regenerative type generally indicated by numeral 10 comprising compressor section 12, burner section 14, turbine section 16 receiving the exhaust gases discharging from the burner for driving the compressor and tailpipe section or nozzle section 18. The heat exchanger 20 schematically illustrates a type of regenerative system and serves to place the incoming air to the burner in indirect heat exchange with the air discharging from the turbine. For this purpose, passage 22 admits burner inlet air into heat exchanger 20 and delivers it to the burners through line 24 while passage 26 admits turbine discharge air into heat exchanger 20 and discharges it through passage 28 to ambient.

The fuel control generally illustrated by numeral 30 serves to meter fuel being pressurized by pump 32 to burner section 14 through line 34. Manifold drain line 261, absolute pressure control 260 and drain line 36 serve to return fuel from the fuel control to the inlet of pump 32. As will be more fully illustrated hereinafter, the fuel control receives several signals from the parameters selected to compute the desired amount of fuel necessary to obtain optimum operation. For this purpose, the fuel control senses the compressor inlet temperature as illustrated via sensing line 38, compressor discharge pressure via line 40, burner discharge pressure via line 32, r.p.m. of the compressor via line 43, and power lever position via line 44. It is to understood that the power lever is mounted somewhere available to the operator of the aircraft and the terminology "power lever" is not particularly limited to a particular lever in the cockpit of the aircraft. Rather, it is intended to cover any linkage connecting the cockpit to the fuel control whether it be referred to as a "go handle," "power lever," or throttle lever or the like. Furthermore, it is to be understood that the use of regenerative types of turbine types of engines is shown merely for illustrative purposes and is not to be construed as being limited thereto. As will be obvious to one skilled in the art, this concept is equally applicable to control straight jets, turboprop jets, regenerative types of jet engines whether it is of the solid spool or the free turbine type of engine. It will be appreciated that for a regenerator type of power plant it is preferred to sense the pressure upstream of the regenerator and downstream of the burner to obtain the burner pressure drop signal.

Figure 2:
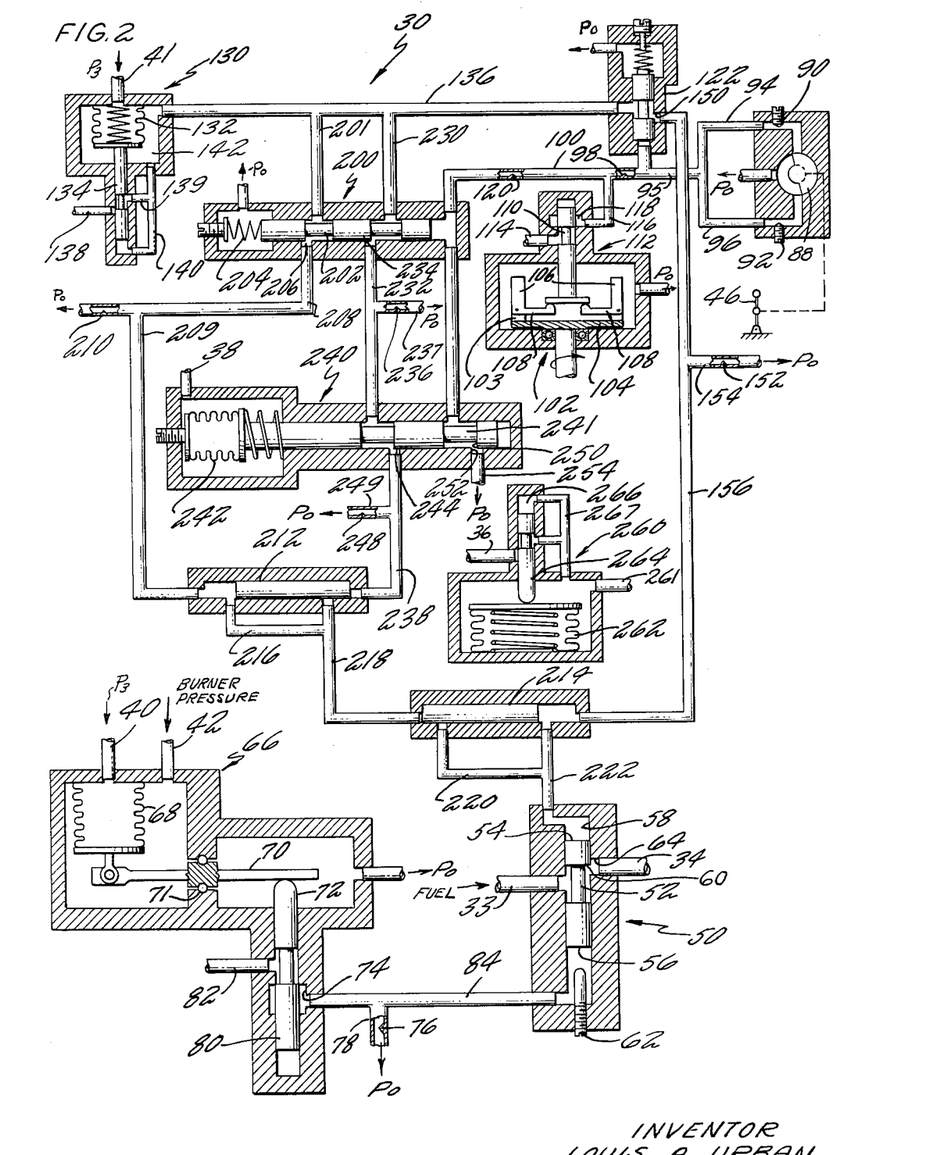
FIGURE 2 is a schematic illustration showing a fuel control utilizing the concept of this invention.

As illustrated in FIGURE 2, fuel is admitted to throttle valve generally indicated by numeral 50 through line 33 where it is metered to the engine via passage 34. (It will be understood that like numerals reference like parts in the various drawings.) Throttle valve 50 comprises spool 52 having its ends 54 and 56 subjected to metered pressures for positioning the spool in cylinder 58. Metering edge 60 of spool 52 cooperates with port 64 for establishing the proper area for metering the required amount of fuel to the engine. The maximum travel of spool 52 is governed by adjustable stop 62 which serves to define the minimum opening of port 64 for establishing the minimum fuel flow to the engine. It may be desirable to maintain the pressure drop across the throttle valve at a constant value, particularly during the minimum fuel flow schedule. A suitable pressure control is shown in the 2,822,666 patent supra.

Hydraulic pressure, whose value is proportional to the actual pressure drop across the burner, is admitted into cylinder 58 to act on end 56 of spool 52. This pressure is established by the burner pressure drop sensor generally indicated by numeral 66 which comprises bellows 68 having its free end suitably connected to lever 70. Pressure through line 40 is admitted internally of bellows 68 and pressure through sensing line 42 is admitted to act externally over bellows 68. Obviously, the force on lever 70 will be indicative of the difference between the two pressures so that the signal produced by the movement of lever 70 is proportional to the pressure drop across the burner. The free end of lever 70 acts against pilot valve 72 by virtue of its rotational movement about pivot 71 which valve serves to meter pressure across port 74 for regulating the pressure drop across fixed restriction 76 disposed in drain line 78. Hence, the relationship between land 80 and port 74 of valve 72 define an area for admitting fluid from supply line 82 which receives fluid from line 136 into passage 84. This cooperation is such that the pressure in line 84 acting on end 56 of spool 52 is a function of the actual pressure drop across the burners.

In order to more fully understand this invention, the description that will immediately follow will be concerned with the mechanism for holding the operation of the engine at its steady-state value. Referring for the moment to FIGURE 3, which is a plot of the ratio of the pressure drop across the burner to compressor discharge pressure versus the corrected speed of the compressor, curve A represents the steady-state operation of the engine, curve B represents an infinite number of droop governor lines which are characteristic of the operation of the governor, curve C represents the corrected temperature of the engine ($T_4/T_2$) and curve D represents surge. Assume for illustration purposes that it is desired to control the engine at point E which falls on the steady-state line at the point where line B intersects line A and assuming that this is at 50% of the desired speed of the compressor. To obtain this value, pilot lever 46 is rotated to position valve 88 which varies the area of orifices 90 and 92 for dumping fluid out of lines 94 and 96 and establishing a pressure therein equivalent to the power desired when the pressure in passage 100 corresponds to 50% actual compressor speed. Setting the area of orifices 90 and 92 serves to control the pressure ratio between the pressure in passages 100 and 95 disposed upstream and downstream of orifice 98 respectively. From the foregoing, it is apparent that the pressure evidenced between orifice 98 and orifices 90 and 92 is a function of the displacement or position of throttle lever 46 and the pressure in passage 100, and essentially is the speed signal at which the compressor is desired to rotate.

The governor generally indicated by numeral 102 serves to measure the speed of the compressor and produce a signal indicative of the actual speed of the compressor. Governor 102 contains rotating platform 104 carrying a pair of flyweights 106 pivotally mounted on upstanding members 103, each of which contain arms 108 bearing against spool 110 of speed control valve 112. The force created by the flyweights is a function of speed squared. This valve serves to meter high pressure fluid issuing from line 114 into passage 100 via port 118 and branch line 116, and the metering edge of spool 110 establishes an area for metering high pressure fluid into port 118 for producing a pressure in line 116 to be equivalent to a function of the square of the speed of the compressor. Fluid leaking around spool 110 seeks to the upper side thereof to counteract the force created by the flyweights. The metering edge of spool 110 may be considered as a variable area orifice and its variation in area controls and establishes the pressure drop across itself to create a pressure in passage 100 which when applied to the upperside of spool 110 balances the flyweight force. Hence, it is apparent that the pressure acting on the underside of pilot valve 122 is a function of actual speed and power lever position which is speed error.

Still referring to FIGURE 2, it will be further noted that compressor discharge pressure is sensed by compressor discharge sensor generally indicated by numeral 130 which comprises bellows 132 and control valve 134. Compressor discharge pressure transmitted via line 41 is admitted internally of bellows 132 which is surrounded by hydraulic fluid. The free end of the bellows abuts against the end of control valve 134 to position it as a function of the value of the compressor discharge pressure. Hence, the pressure in passage 136 is established to be a function of compressor discharge pressure. This is accomplished by metering pressure from the high supply pressure line 138 through valve 134 into lines 139 and 140 connected to chamber 142. Valve 134 displaces until the pressure in chamber 142 is equal to the pressure internally of the bellows. When valve 134 is in its balanced position, that is, when it no longer continues to travel, the pressure in chamber 142 and hence line 136 has been established. It will be noted that the under end of valve 134 is counteracted by the pressure equivalent to the pressure in chamber 142 by the interconnection made via lines 139 an d140. This assures that the pressure established by valve 134 is solely a function of a compressor discharge pressure.

The metering land of valve 122 cooperating with port 150 is designed so that its area is a function of the scheduled pressure drop across the burner divided by the compressor discharge pressure. By virtue of the relationship of orifice 150 with respect to orifice 152 which is disposed in line 154 leading fluid to drain, a multiplication is effectuated which results in a pressure in passage 156 which is a function of the product of the pressure in passage 136 and the ratio of orifice areas 150 to 152. Hence, compressor discharge pressure component is multiplied out so that pressure in line 156 is now solely in terms of the desired pressure drop across the burner which has been established as a function of speed of the compressor, pilot lever position and compressor discharge pressure.

This pressure is fed into cylinder 58 to act on end 54 of spool 52 of the throttle valve. This pressure counteracts the force created by the pressure on end 56 of the throttle valve and the throttle valve being of the integrating type, spool 52 translates at a constant velocity which is a function of the magnitude of the error between the two pressures. This causes flow to be metered through the throttle valve to the engine until the pressures on either end of spool 52 are balanced. When this occurs, the engine will be operating at point E as shown in FIGURE 3.

Now that the steady-state operation of the control has been described, the next portion of the specification will be concerned with describing the acceleration schedule of the control which permits the throttle valve to regulate fuel to the engine while preventing the engine from becoming overheated and preventing the compressor from operating in the surge region. This is illustrated in FIGURE 3 by curves C and D respectively.

Still referring to FIGURE 2, it will be noted that fluid in line 136 is directed to the valve generally indicated by numeral 200 via line 201, which pressure has been established by the compressor discharge pressure sensor 130. Valve 200 comprises spool 202 subjected to the forces of spring 204 acting on one of its ends and a controlled pressure acting on the opposing end. Metering edge 206 on spool 202 is so designed that it meters fluid discharging from valve 200 into line 208 so that the pressure in line 208 is a function of the scheduled surge limiting value of the pressure drop across the burner. As will be more fully explained hereinafter, the pressure creating the force acting on one side of spool 202 is a function of corrected speed or speed squared divided by temperature of the inlet of the compressor. Metering land 206 is designed so that it is a function of the scheduled surge limiting value of the pressure drop across the burner divided by compressor discharge pressure. As it meters flow from line 201, which as indicated above is a function of compressor discharge pressure, a multiplication effect takes place in a manner similar to that described in connection with valve 122. This multiplication, in essence, in a multiplication of the burner pressure drop divided by compressor discharge pressure times compressor discharge pressure, thus canceling out the compressor discharge pressure term so that the pressure between restriction 210 and the metering land 206 is solely a function of scheduled burner pressure drop. Its value is the point where surge would ensue if the ratio of the burner pressure to compressor discharge pressure goes below a predetermined value; namely, that shown as curve D as shown in FIGURE 3. Hence, if the pressure should go below line D when operating within a specific speed range, surge would ensue.

It will be noted from the drawing that the fluid in line 208 is directed via line 209 to temperature-surge-selector valve 212 and the acceleration-governor-selector valve 214. In the position as shown in FIGURE 2, the temperature-surge-selector valve 212 is placed in the extreme right position. This is due to the fact that the pressure on the left-hand end is at a higher value than the pressure on the right-hand end. In this position, line 216 communicates with lines 209 and 218 for directing this pressure to act on the left-hand end of acceleration-governor-selector valve 214. Since the right-hand end of acceleration-governor-selector valve 214 is subjected to the pressure in line 156, which as described above, is a function of the scheduled burner pressure drop, which, in turn, is a function of the ratio of burner pressure drop to compressor discharge pressure, it will shift to the right if the burner pressure drop goes below line D (see FIG. 3). Hence, if the force created by the pressure generated by valve 200 evidenced on the left-hand end of acceleration-governor-selector valve 214 increases over the force acting in an opposing direction, the valve will shift to the right connecting lines 220 and 222 with line 218 for applying that pressure on end 54 of throttle valve 50. This has the effect of urging spool 52 of throttle valve 50 in a downward direction to prevent the weight flow of fuel to the engine from exceeding a value which would cause the engine to surge and hence, maintain the operation of the engine above line D which is the surge limit of engine operation.

Control valves 200 and 240 cooperate to assure that the engine does not go above a maximum temperature. Control valve 200 meters compressor discharge pressure fluid through line 230 into line 232. The contour of metering edge 234 of spool 202 is designed so that it defines an area of cooperating metering port as a function of burner pressure drop divided by compressor discharge pressure and compressor inlet temperature raised to some power. As was mentioned in connection with the operation of the metering edge 206 in connection with the fixed restriction 210, the operation of metering edge 234 in connection with restriction 236 disposed in drain line 237 is such that the value of the pressure in line 232 is the product of the multiplication between the pressure of line 230 which is a function of compressor discharge pressure and the function of the area of the metering edge 234. This multiplication produces a pressure in line 232 equal to a function of the pressure drop across the burner times the temperature at the inlet of the burner raised to some power.

Control valve 240 serves to place the pressure in line 238 in terms compatible with the term used in controlling the throttle valve 50. Schematically illustrated, valve 240 responds to the position of bellows 242 which is acted on by compressor inlet temperature air and produces a signal whose value is equivalent to the temperature at the inlet of the compressor. This signal then translates spool 241 of valve 240 for controlling the area created by metering edge 244. This area is made to vary as a function of the reciprocal of the temperature of the inlet of the compressor raised to some power. Its relationship with the fixed restriction 248 disposed in drain line 249 which is similar to the relationship described in connection with the area established by metering edge 206 and restriction 210 produces a multiplication between the terms represented by the pressure in line 232 and the term introduced by metering edge 244. Hence, the factor of temperature represented by the pressure in line 232 is canceled out in line 238 so that the pressure in line 238 becomes solely a function of the pressure drop across the burner. Since this pressure acts on the right-hand end of temperature-surge-selector valve 212, it will cause the valve to shift to the left interconnecting line 238 and line 218 to cause this pressure to act on the left-hand end of acceleration-governor-selector valve 214 when it exceeds the pressure acting on the left-hand end. In essence, then, if the temperature should exceed the value represented by curve C of FIGURE 3, the pressure on the left-hand end of acceleration-governor-selector valve will exceed the pressure acting on the right-hand end, causing the valve to shift to the right interconnecting lines 218 and 222 and chamber 58 subjecting end 54 of throttle valve 50 to that pressure. This pressure prevents the throttle valve from metering a fuel flow which would result in over-temperaturing the engine by maintaining system operation above curve C on FIGURE 3.

Curve C is a line of constant corrected turbine inlet temperature and for a specified value of inlet temperature describes a specific turbine inlet temperature limit. The control system described herein utilizes a mathematical expression which defines a relationship between a specific value of turbine inlet temperature and burner pressure drop divided by burner pressure multiplied by compressor inlet temperature raised to a power at a specified value of corrected speed. Hence, for each value of corrected speed, a constant turbine inlet temperature can be described as a function of burner pressure drop divided by burner pressure and compressor inlet temperature raised to a power as illustrated in FIGURE 4. As can be seen from FIGURE 4, curve M represents the surge limit and the area defined under the curve represents the surge region, i.e., where surging of the compressor would ensue. Curve N represents the temperature limit and the area defined under this curve represents the over-temperature region.

The pressure acting on the right-hand end of spool 202 of valve 200 is established by valve 240 and governor 102 which, as indicated above, positions the spool as a function of temperature at the inlet of the compressor and speed of the compressor. Metering edge 250 of valve spool 241 cooperates with port 252 defining an area equal to a function of the temperature of the inlet of the compressor. The opening thereof bleeds pressure from line 100 to drain via line 254 for controlling the pressure drop across restriction 120. This has the effect of establishing a pressure downstream of restriction 120 to be equivalent to a valve which is a function of speed squared divided by the temperature of the inlet of the compressor. The combined effect of valves 200 and 240 establishes a maximum temperature line and relates this temperature limit in terms compatible with the terms controlling the throttle valve; namely, making that pressure equivalent to a function of the scheduled value of the pressure drop across the burner.

Since it is desirable to compute the terms of the parameters in their absolute values rather than gauge pressure values, absolute pressure control 260 is employed. This control is located in the drain line (all the drain line indicated by $P_o$ in the drawings) for controlling the drain pressure of all the control valves to equal the absolute value established by evacuator bellows 262. Bellows 262 acts against spool 264 which is counterbalanced by drain pressure admitted into chamber 266 via line 267. It will be appreciated that the various drain lines lead drain fluid back to the input of the pump (see FIG. 1). Pressure control 260 is located in the drain manifold line 261 and serves to meter drain fluid into drain line 36. This establishes a datum line equivalent to an absolute value so that the pressure control values use a zero pressure datum rather than a gauge pressure datum.

In summary, therefore, the control assures operation of the engine as shown in the graph of FIGURE 3. For steady-state operation, the pilot lever 46 establishes the desired power by producing a signal which is converted into a pressure value. This signal can be considered as the desired speed of the compressor. Governor 102 serves to measure actual speed and convert it to a pressure signal which is equal to a function of the square of compressor speed. Both of these pressure signals are mixed and the resultant pressure is sensed by valve 122. The change in this pressure from a set point is equivalent to the error between actual speed and desired speed.

Valve 122, then converts this signal in terms of the control parameter $$\frac{\Delta P_b}{P_3}$$

by varying the area of its metering orifice as a $$f\left(\frac{\Delta P_b}{P_3}\right)$$

Actual $P_3$ is measured by control 130 and produces a pressure equal to a $f(P_3)$ which is applied to the metering orifice of valve 122. Here the functions are multiplied so that the output of valve 122 is a fluid pressure whose value is a $f(\Delta P_b)$.

This value represents the ratio $$\frac{\Delta P_b}{P_3}$$

of the control parameter, but is in a simplified term expressing the scheduled power (by virtue of power lever position, speed and compressor discharge pressure) at which the engine is desired to operate.

The actual burner pressure drop is measured by control 66 and converts its signal to a fluid pressure which is a $f(\Delta P_b)$. This represents the actual pressure drop across the burner. It will be noted that the term $f(\Delta P_b)$ obtained by the power lever, compressor discharge pressure sensor, and governor represents the scheduled pressure drop across the burner. The integrating throttle valve senses the difference between both values and changes fuel flow to the engine until both pressures have been balanced which is at the steady-state operation point.

The acceleration schedule is designed to allow fuel to be metered to the engine at its highest flow capacity but yet preventing the temperature to increase beyond the structural limits of the engine's component parts and preventing the compressor from operating within the surge region. This is represented in FIGURE 3 by curves C and D. It will be noted that the present fuel control computes both the temperature limit $T_4$ and surge limit and allows the higher of the two signals to control. That is to say that the two values (temperature and surge) are computed in terms of the control parameter and the higher $$\frac{\Delta P_b}{P_3}$$

of the two controls.

To compute the surge schedule, pressure equivalent to a $f(P_3)$ as generated by control 130 is fed to valve 200 which generates the $f(\Delta P_b)$ surge signal. This is accomplished by designing the metering land to vary its area as a $$f\left(\frac{\Delta P_b}{P_3}\right)$$

surge. The valve multiplies this function by $f(\Delta P_3)$ to produce the $f(\Delta P_b)$ surge pressure value. The position of this valve is varied as a $f(N^2/T_2)$ which is established by governor 102 and valve 240. It will be noted that the $f(N^2/T_2)$ is the abscissa of the chart shown in FIGURE 3.

Hence, it is apparent from the foregoing that valve 200 produces a pressure which is a function of the control parameter $$\frac{\Delta P_b}{P_3} \text{ and } N/\sqrt{T_2}$$

so that the curve D can be defined in control functions.

The overtemperature is limited in accordance with curve C of FIGURE 3 by valves 240 and 200. It will be noted that curve C represents turbine inlet temperature corrected by compressor inlet temperature, $T_4T_2$. The curve shown in FIGURE 4 illustrates the relationship utilized by this control system.

To this end, the schedule for overtemperature is governed by valve 200 which is positioned as $f(N^2/T_2)$ representing the abscissa of the graph in FIGURE 4. (Note the plot of the graph is in terms of $$\frac{N}{\sqrt{T_2}}$$

which is merely a different expression for the same equation). The metering land of spool 202 of valve 200 defines an area of its metering port to be a $$f\left(\frac{\Delta P_b}{P_3}T_2^x\right)$$

which establishes the desired turbine inlet temperature limit. This valve also multiplies the pressure signal $f(P_3)$ by this function to produce a pressure value equal to a $f(\Delta P_b T_2^x)$.

The area of the orifice defined by metering land 244 of valve 240 varies as a $$f\left(\frac{1}{T_2^x}\right)$$

and this valve serves to multiply this function by $$f(\Delta P_b T_2^x)$$

This produces a pressure signal in terms compatible with the terms of the pressure signal applied to the throttle valve; namely, $f(\Delta P_b)$.

Valve 212 then senses both the surge signal and the overtemperature signal and directs pressurized fluid equivalent to the function of the higher value to valve 214. Valve 214 then senses this signal and compares it with the desired steady-state signal and directs the greater of the two to throttle valve 50. In this manner, the limits to prevent surge and overtemperature are provided, and the acceleration schedule is established.

*Operation*

The operation of the fuel control is best described by referring to FIGURE 3. Assuming that the fuel control is put in the on-condition from the off-condition. The pilot rotating the power lever establishes a signal desired to produce the desired thrust or horsepower required for the particular aricraft manuever. This sets the governor and the ratio $\Delta P_b/P_3$ to operate at the prescribed condition. Assume that 100% power is desired for the steady-state operation as represented by point F intersecting the droop governor line B at steady-state line A.

The power lever control has the effect of generating a signal to the throttle valve to call for maximum fuel flow so that engine operation at this point is defined by line G. Throttle valve 50 will translate in a direction to increase quantity of fuel to the engine until line G approaches curve C. The temperature limit of the acceleration schedule then takes over and schedules fuel flow which results in operation along line H. As the speed of the compressor increases, fuel flow is scheduled by the surge limiter of the acceleration schedule as defined by curve J until it again reaches the overtemperature curve C, where the overtemperature control once more takes over control of the throttle valve.

When the engine is operating at a level approaching droop line B, the governor takes over control of the throttle valve to reduce fuel flow along droop line B until the engine operations have reached point F.

Figure 5:
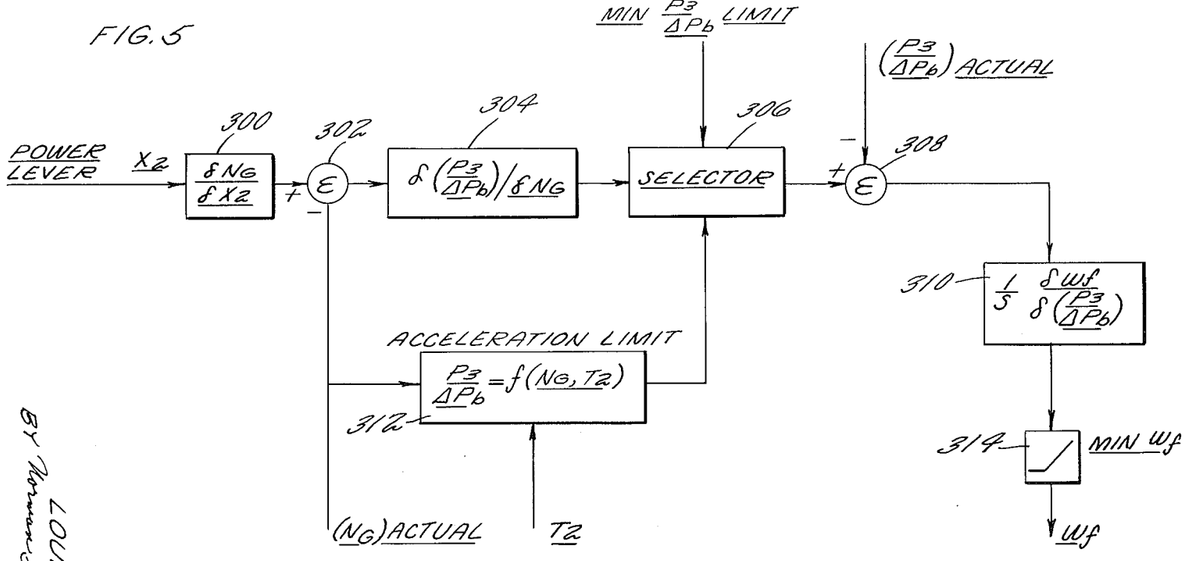
FIGURE 5 is a block diagram schematically illustrating the basic concept of this invention.

While FIGURE 2 illustrates schematically mechanism for providing a fuel control for accomplishing the schedule shown in FIGURE 3, it will be obvious to one skilled in this art that this merely represents one way of executing the basic concept. For clarification, FIGURE 5 is included herein to show fundamentally the execution of the concept of utilizing $\Delta P_b/P_3$ as the primary control parameter.

Referring now generally to the block diagram shown in FIGURE 5, it will be noted that the position of the power lever is indicated by the symbol $X_2$ and the other symbols represent term salready designated herein above. $X_2$ is fed into block 300 where it is computed in terms of $$\frac{\delta N_g}{\delta X_2}$$

where $\delta$ merely represents the rate of change.

The output is fed to block 302 where it is compared with the actual $N_g$ for producing an error output signal.

Block 304 then computes this term in the form $$\delta\left(\frac{P_3/\Delta P_b}{\delta N_g}\right)$$

and transmits it to selector block 306. The selector serves to transmit the lower or higher value of one of several signals fed thereto for transmitting it to the next summation junction. This junction is represented by block 308 which responds to actual $P_3/\Delta P_b$. The two signals are compared and the difference $$\left(\frac{P_3}{\Delta P_b}\right)$$

error is transmitted to block 310. Block 310 represents mechanism for converting this signal into terms of fuel flow compatible with the amount established by the fuel control. As noted in the drawing, symbol S represents a La Place transform function representing the integration of the magnitude of the $P_3/\Delta P_b$ error signal.

The mechanism for obtaining acceleration schedule is represented by block 312 which receives both the $N_g$ actual signal and the T actual signal and computes these values in terms of $$\frac{P_3}{\Delta P}$$

This signal is fed to the selector 306 which transmits it to the summation junction 308 upon reaching a predetermined value.

The selector 306 also senses a minimum $$\frac{P_3}{\Delta P}$$

limit schedule and transmits it upon reaching a predetermined value. Both these signals are eventually sent to the integrator for positioning the throttle valve for controlling the fuel flow.

Block 314 illustrates the mechanism serving to establish the minimum fuel flow.

In order to establish the control pressure, it was necessary in several instances to perform a multiplication. The multiplication in each of these instances was accomplished by varying the area of an orifice designed to vary at a predetermined function. For example, in the instance where the control computed a speed error signal in terms of $f(\Delta P_b)$, valve 122 multiplied the pressure whose value was established as $f(P_3)$ times the area of the metering land which was established as $$f\left(\frac{\Delta P_b}{P_3}\right)$$

This may be shown as follows:

Consider that orifice 150 ($A_{150}$) is in series with restrictor 152 ($A_{152}$) and $P_u$ is the pressure upstream of $A_{150}$; $P_i$ is the pressure intermediate $A_{150}$ and $A_{152}$; $P_d$ is the pressure downstream of $A_{152}$; and A is a symbol representing the area of the particular orifice.

It is well known that:

$$Q = KA\sqrt{\Delta(P)}$$

where, $Q$ = volume flow through orifice
$K$ = Some design constant
$A$ = area
$\Delta P$ = pressure drop across an orifice then $$Q_{150} = KA_{150}\sqrt{P_u - P_i}$$

and $$Q_{152} = KA_{152}\sqrt{P_i - P_d}$$

however $$Q_{150} = Q_{152}$$

then $$\frac{A_{152}}{A_{150}} = \frac{\sqrt{P_u - P_i}}{\sqrt{P_i - P_d}}$$

multiplying out the square root, then $$\frac{(A_{152})^2}{(A_{150})^2} = \frac{P_u - P_i}{P_i - P_d}$$

and adding to the expression $(P_d - P_d)$ $$\frac{(A_{152})^2}{(A_{150})^2} = \frac{(P_u - P_i) + (P_d - P_d)}{P_i - P_d}$$

by factoring $$\frac{(A_{152})^2}{(A_{150})^2} = \frac{(P_u - P_d) - (P_i - P_d)}{P_i - P_d}$$

and $$\frac{(A_{152})^2}{(A_{150})^2} = \frac{P_u - P_d}{P_i - P_d} - 1$$

rearranging $$\frac{P_u - P_d}{P_i - P_d} = 1 + \frac{(A_{153})^2}{(A_{150})^2}$$

or $$\frac{P_i - P_d}{P_u - P_d} = \frac{1}{1 + (A_{152})^2/)A_{150})^2}$$

$$P_i - P_d = \left[\frac{1}{1 + (A_{152}/(A_{150})^2}\right](P_u - P_d)$$

thus vary $A_{150}$ such that $$\frac{1}{1 + (A_{152})^2/(A_{150})^2} = \text{desired } f\left(\frac{\Delta P_b}{P_3}\right)$$

since $P_u - P_o = f(P_3)$ then the pressure in line 156

$$= f(P_3) \times f\left(\frac{\Delta P_b}{P_3}\right)$$

therefore, pressure in line $156 = f(\Delta P_b)$

Preferably, the various computing and metering valves of this fuel control should be of the continuously rotating type in order to keep the frictional effect to a minimum. Rotating valves are not new and a detailed description thereof is omitted herein for the sake of simplicity and convenience.

What has been shown by this invention is a fuel control for any gas turbine engine utilizing a pressure drop across the burner of the engine divided by the compressor discharge pressure as a primary control parameter. The use of this parameter enables the fuel control to automatically provide a steady-state control operation as well as an acceleration schedule assuring that a malfunction will not be perpetrated by virtue of overtemperature or surge.

It should be understood that the invention is not limited to the particular embodiments shown and described herein, but that various changes and modifications may be made without departing from the spirit or scope of this novel concept as defined by the following claims.

I claim:

1. A fuel control for a power plant having a turbine, a compressor and a burner, means for regulating the flow of fuel to the burner, means for establishing a first signal commensurate with a desired ratio of compressor discharge pressure to pressure change across the burner, means providing a second signal which is a function of the actual pressure change across the burner, and means comparing said signals and producing a resultant signal controlling said fuel regulating means.

2. In a fuel control for a turbine type of power plant having a compressor, a burner and a turbine receiving the exhaust gases from said burner for driving said compressor, a power lever, a source of fuel under pressure, passage means interconnecting said source and said burner, fuel regulating means in said passage means regulating the flow of fuel passing therethrough, means responsive to a function of compressor speed, a function of the compressor discharge pressure and the position of said power lever for producing an output signal equivalent to a scheduled pressure drop across said burner, and means responsive to said signal for controlling said fuel regulating means.

3. A fuel control for a power plant for aircraft, said fuel control having a power lever, said power plant having a compressor, a burner and a turbine driving said compressor, a source of fuel under pressure, passage means interconnecting said source and said burner, fuel regulating means in said passage means regulating the flow of fuel passing therethrough, means responsive to compressor discharge pressure, compressor speed, power lever position and compressor inlet temperature to schedule a desired value of $$\frac{\Delta P_b}{P_3}$$

for various values of $$N/\sqrt{T_2}$$

for controlling said fuel regulating means, where:

$\Delta P_b$ = the pressure drop across the burner
$P_3$ = compressor discharge pressure
$N$ = the speed of rotation of the compressor
$T_2$ = compressor inlet temperature 4. Means for scheduling the steady-state and acceleration operation of a turbine type of power plant having a compressor, a burner and a turbine receiving the exhaust gases of the burner for driving the compressor, said means having fuel regulating means movable in response to compressor speed and the ratio of the pressure drop across the burner to compressor discharge pressure during steady-state operation and movable in response to the ratio of the pressure drop across the burner to compressor discharge pressure, compressor inlet temperature and speed of said compressor during acceleration.

5. Closed loop control means scheduling the steady-state and acceleration operation of a turbine type of power plant having a compressor, a burner and a turbine receiving the exhaust gases from the burner for driving the compressor, said closed control means including speed setting means and fuel regulating means movable in response to the position of said speed setting means, compressor rotational speed and the ratio of compressor discharge pressure to the pressure drop across the burner during steady-state operation and movable in response to compressor rotating speed, compressor inlet temperature and the ratio of compressor discharge pressure to the pressure drop across the burner during acceleration operation.

6. An engine having a compressor, a burner and a turbine receiving the exhaust gases from the burner for driving the compressor, a source of fuel under pressure, connection means interconnecting said source and said burner, a throttle valve in said connection means regulating the flow of fuel passing therethrough, means for scheduling the ratio of compressor discharge pressure to pressure drop across the burner for controlling said throttle valve and means responsive to compressor inlet temperature and compressor rotational speed for varying said last mentioned means.

7. For a fuel control for an engine having a compressor, a burner and a turbine receiving the exhaust gases from the burner for driving said compressor, a source of fuel under pressure, passage means interconnecting said source and said burner, valve means in said passage means for regulating the flow of fuel passing therethrough, means responsive to the rotational speed of the compressor for controlling said valve means during steady-state engine operations and additional means responsive to the ratio of compressor discharge pressure to the pressure drop across the burner, compressor inlet temperature and rotational speed of the compressor for further controlling said valve means during acceleration of the engine.

8. A fuel control for delivering a controlled amount of fuel to a turbojet engine, which engine has a compressor, combustion section and turbine, fuel regulating means regulating the amount of fuel injected into the combustion section, speed setting means for producing a first signal, means responsive to the rotational speed of the compressor for producing a second signal, means responsive to the difference between the first and second signal for producing a scheduled ratio of compressor discharge pressure to combustion section pressure drop signal, means responsive to the actual compressor discharge pressure for producing a third signal, and means receiving said third signal and the scheduled ratio of compressor discharge pressure to combustion section pressure drop signal for producing a fourth signal and means responsive to said fourth signal for controlling said fuel regulating means.

9. For a fuel control for a turbine type of power plant having a compressor, a burner and a turbine receiving the exhaust gases from the burner for driving the compressor, means for scheduling the acceleration of the compressor and maintaining the gases from going above a predetermined temperature and preventing the compressor from surging, said means including a movable valve regulating the amount of fuel to the burner, said valve movable in response to the ratio of the pressure drop across the burner to compressor discharge pressure, and compresor inlet temperature and the speed of the compressor.

10. A fuel control in combination with a turbine type of power plant having a compressor subject to surge, a burner, a turbine receiving the exhaust gases from the burner for driving the compressor and a heat exchanger disposed between said compressor and said burner, said fuel control having means including a fuel regulating valve for scheduling the acceleration of said power plant to prevent the gases from going above a predetermined value of temperature and prevent compressor surge, said means responsive to:

(a) the ratio of the pressure drop across the combined heat exchanger and burner to the compressor discharge pressure, and
(b) speed of the compressor, and
(c) compressor inlet temperature.

11. A fuel control for delivering a controlled amount of fuel to a turbojet engine, which engine has a compressor, burner, turbine and heat adding means between said burner and compressor comprising fuel regulating means regulating the amount of fuel injected into the burner, speed setting means for producing a first signal, means responsive to the rotational speed of the compressor for producing a second signal, means responsive to the difference between said first and said second signal for producing a scheduled signal equal to a desired ratio of compressor discharge pressure to pressure drop across the combined heat adding means and burner, means responsive to the actual ratio of the compressor discharge pressure to the pressure drop across the combined heat adding means and burner for producing a third signal, and means responsive to the difference between said third signal and said scheduled signal for controlling said fuel regulating means.

12. A fuel control for delivering a controlled amount of fuel to a regenerative type of turbojet engine, which engine has a compressor, burner, turbine and a heat exchanger between said compressor and said burner comprising fuel regulating means regulating the amount of fuel injected into the burner, speed setting means for producing a first signal, means responsive to the rotational speed of the compressor for producing a second signal, means responsive to the difference between the first and second signal for producing a first scheduled signal equal to a scheduled ratio of compressor discharge pressure to the pressure drop across the combined heat exchanger and burner, means responsive to the actual ratio of the compressor discharge pressure to the pressure drop across the combined heat exchanger and burner for producing a third signal, means responsive to the difference between said third signal and said first scheduled signal for controlling said fuel regulating means, means responsive to a function of compressor rotational speed and a function of compressor inlet temperature for producing a second scheduled signal equal to a scheduled ratio of compressor discharge pressure to the pressure drop across the combined heat exchanger and burner, and means responsive to the difference between said second scheduled signal and said third signal for further controlling said fuel regulating means.

13. A fuel control for delivering a controlled amount of fuel to a turbojet engine for establishing stead-state and acceleration operation conditions, which engine has a compressor, combustion section, and turbine, fuel regulating means regulating the amount of fuel injected into the combustion section, speed setting means for producing a first signal, means responsive to the rotational speed of the compressor for producing a second signal, means responsive to the difference between the first and second signal for producing a scheduled ratio of compressor discharge pressure to combustion section pressure drop signal, means responsive to the actual ratio of compressor discharge pressure to the combustion section pressure drop for producing a third signal, means responsive to the difference between said third signal and the scheduled ratio of compressor discharge pressure to combustion section pressure drop signal for controlling said fuel regulating means during steady-state operation, and means responsive to the compressor rotational speed and compressor inlet temperature for producing another scheduled ratio of compressor discharge pressure to combustion section pressure drop signal, and means responsive to the difference between said third signal and said other scheduled ratio of compressor discharge pressure to combustion section pressure drop signal for further controlling said fuel regulating means during acceleration operation.

14. A fuel control for delivering a controlled amount of fuel to a turbojet engine for establishing steady-state and acceleration operation conditions, which engine has a compressor, burner, turbine, comprising fuel regulating means regulating the amount of fuel injected into the burner, speed setting means for producing a first signal, means responsive to the rotational speed of the compressor for producing a second signal, means responsive to the difference between the first and second signal for producing a scheduled ratio of compressor discharge pressure to burner pressure drop signal, means responsive to the actual ratio of compressor discharge pressure to burner pressure drop for producing a third signal, means responsive to the difference between said third signal and the scheduled ratio of compressor discharge pressure to burner pressure drop for controlling said fuel regulating means during steady state, means responsive to compressor rotational speed for producing a fourth signal, means responsive to compressor inlet temperature for producing a fifth signal, means for combining said fourth and fifth signal for producing another scheduled ratio of compressor discharge pressure to burner pressure drop signal, and means responsive to the difference between said third signal and said other scheduled ratio of compressor discharge pressure to burner pressure drop signal for further controlling said fuel regulating means during acceleration.

References Cited by the Examiner

UNITED STATES PATENTS

| | | |
|---|---|---|
| 2,592,385 | 4/1952 | Borden. |
| 2,740,295 | 4/1956 | Perchonok 60—39.28 X |
| 2,792,685 | 5/1957 | Constantino 60—39.28 |
| 2,809,492 | 10/1957 | Arkawy 60—39.28 |
| 2,857,739 | 10/1958 | Wright 60—39.28 X |
| 2,970,436 | 2/1961 | Sims 60—39.28 |
| 2,976,683 | 3/1961 | Flanigan 60—39.51 X |
| 2,979,894 | 4/1961 | Zeisloft 60—39.28 |
| 2,984,977 | 5/1961 | Embree 60—39.28 |

OTHER REFERENCES

Sobey: Control of Aircraft and Missile Powerplants, New York and London, John Wiley and Sons, Inc., page 11 relied on.

JULIUS E. WEST, *Primary Examiner.*

MARK NEWMAN, *Examiner.*